(12) United States Patent
Smith et al.

(10) Patent No.: US 7,879,434 B2
(45) Date of Patent: Feb. 1, 2011

(54) FOAM ELEMENT HAVING MOLDED GAS PASSAGEWAYS

(75) Inventors: Matt Smith, Chicago, IL (US); Adam King, Washington, MI (US)

(73) Assignee: Proprietect L.P. (CA)

( * ) Notice: Subject to any disclaimer, the term of this patent is extended or adjusted under 35 U.S.C. 154(b) by 0 days.

(21) Appl. No.: 11/535,686

(22) Filed: Sep. 27, 2006

(65) Prior Publication Data

US 2007/0248789 A1    Oct. 25, 2007

Related U.S. Application Data

(63) Continuation of application No. 10/689,069, filed on Oct. 21, 2003, now abandoned, which is a continuation of application No. 09/633,280, filed on Aug. 4, 2000, now abandoned.

(51) Int. Cl.
*B32B 5/00* (2006.01)
*B32B 3/26* (2006.01)
*B32B 3/30* (2006.01)
*B32B 27/00* (2006.01)

(52) U.S. Cl. .................. 428/158; 428/98; 428/156; 428/159; 428/167; 428/318.4; 428/318.8; 521/50

(58) Field of Classification Search ................. 428/131, 428/158, 318.4, 318.8, 166, 98, 156, 159, 428/167; 521/50
See application file for complete search history.

(56) References Cited

U.S. PATENT DOCUMENTS

| | | |
|---|---|---|
| 3,209,380 A | 10/1965 | Watsky |
| 3,644,168 A * | 2/1972 | Bonk et al. ............... 442/213 |
| 4,003,113 A | 1/1977 | Bulloch, Jr. |
| 4,078,348 A | 3/1978 | Rothman |
| 4,294,880 A | 10/1981 | Nishida |
| 4,524,102 A | 6/1985 | Hostettler |
| 4,651,494 A | 3/1987 | Van Wagoner |
| 5,085,487 A | 2/1992 | Weingartner et al. |
| 5,143,667 A | 9/1992 | Matsuura et al. |
| 5,400,490 A | 3/1995 | Burchi |
| 5,403,645 A | 4/1995 | Stein et al. |
| 5,463,785 A | 11/1995 | McKeel |
| 5,597,200 A | 1/1997 | Gregory et al. |
| 5,662,996 A | 9/1997 | Jourquin et al. |
| 5,750,246 A | 5/1998 | Yuasa et al. |
| 5,927,817 A | 7/1999 | Ekman et al. |
| 6,197,403 B1 | 3/2001 | Brown et al. |

FOREIGN PATENT DOCUMENTS

| | | |
|---|---|---|
| FR | 2.125.641 | 9/1972 |
| GB | 1 310 373 | 3/1973 |

OTHER PUBLICATIONS

European Office Action for European Patent Application No. 01 960 001.4 with a mailing date of Apr. 16, 2004.

* cited by examiner

*Primary Examiner*—Patricia L Nordmeyer
(74) *Attorney, Agent, or Firm*—Katten Muchin Rosenman LLP

(57) ABSTRACT

In one of its aspects, the invention relates to a foam element comprising an isocyanate-based foam matrix having surface, at least a portion of the surface comprising at least one channel having a channel surface, the channel surface being coated with a substantially fluid impermeable material. The foam element is particularly useful in a climate-control vehicular (e.g., automobile) seat.

70 Claims, 5 Drawing Sheets

FOAM ELEMENT HAVING MOLDED GAS PASSAGEWAYS

This application is a continuation of U.S. patent application Ser. No. 10/689,069, filed Oct. 21, 2003, which is a continuation of U.S. patent application Ser. No. 09/633,280, filed Aug. 2, 2000, both of which are incorporated herein by reference.

BACKGROUND OF THE INVENTION

1. Field of the Invention

In one of its aspects, the present invention relates to a foam element having at least one channel disposed therein, particularly useful in production of a climate-control vehicular seat (or element thereof). In another of its aspects, the present invention relates to a process for production of such a foam element. In yet another of its aspects, the present invention relates to a mold particularly adapted for production of the foam element.

2. Description of the Prior Art

Isocyanate-based polymers are known in the art. Generally, those of skill in the art understand isocyanate-based polymers to be polyurethanes, polyureas, polyisocyanurates and mixtures thereof.

It is also known in the art to produce foamed isocyanate-based polymers. Indeed, one of the advantages of isocyanate-based polymers compared to other polymer systems is that polymerization and foaming can occur in situ. This results in the ability to mould the polymer while it is forming and expanding.

One of the conventional ways to produce a polyurethane foam is known as the "one-shot" technique. In this technique, the isocyanate, a suitable polyol, a catalyst, water (which acts as a reactive "blowing" agent and can optionally be supplemented with one or more physical blowing agents) and other additives are mixed together at once using, for example, impingement mixing (e.g. high pressure). Generally, if one were to produce a polyurea, the polyol would be replaced with a suitable polyamine. A polyisocyanurate may result from cyclotrimerization of the isocyanate component. Urethane modified polyureas or polyisocyanurates are known in the art. In either scenario, the reactants would be intimately mixed very quickly using a suitable mixing technique.

Another technique for producing foamed isocyanate-based polymers is known as the "prepolymer" technique. In this technique, a prepolymer is produced by reacting polyol and isocyanate (in the case of a polyurethane) in an inert atmosphere to form a liquid polymer terminated with reactive groups (e.g. isocyanates). To produce the foamed polymer, the prepolymer is thoroughly mixed with a lower molecular weight polyol (in the case of producing a polyurethane) or a polyamine (in the case of producing a modified polyurea) in the presence of a curing agent and other additives, as needed.

As is known in the art, foamed isocyanate-based polymers are commonly used to produce parts used in vehicles. These include seats and various trim components.

In the production of a seat, particularly one for use in an automobile, it is known in the art to incorporate heating elements in the seat which are then connected to a power supply and a control system to allow the occupant of the automobile to turn on or turn off the heating elements for occupant convenience in colder climates. In the past, this has been achieved by molding into the seating element some form of resistant heating system.

This prior art approach is disadvantageous for a number of reasons.

First, since the heat provided from such a system is somewhat localized, it must be used over substantially the entire surface of the seat which, in many cases, has a deleterious affect on the comfort properties of the seat.

Second, since the heating system is resistive, there is a risk that some of the heat emitted will penetrate the seat rather than emit the seat toward the occupant. This can lead to premature discolouration and wear of the seat component and, in certain circumstances, may present a safety risk. Alternatively, an intermediate projective layer between the heating element and the seat pad could be used, but this adds extra expense and weight to the seat.

Third, the prior system simply provides a heated seat which is of little use to an occupant who seeks improved convenience in a warmer climate.

In light of the foregoing, it would be desirable to have a foam element which could be used in a vehicular seat to provide the ability to cool or heat the occupant in the seat. It would be advantageous if this foam element could be made in a relatively simple manner without the requirement for significant extra capital cost in the foam manufacturing plant.

SUMMARY OF THE INVENTION

It is an object of the present invention to obviate or mitigate at least one of the above-mentioned disadvantages of the prior art.

It is another object of the present invention to provide a novel foam element.

It is another object of the present invention to provide a novel process for producing a foam element.

It is yet another object of the present invention to provide a novel mold for producing a foam element.

Accordingly, in one of its aspects, the present invention provides foam element comprising a foam matrix having surface, at least a portion of the surface comprising at least one channel having a channel surface, the channel surface being coated with a substantially fluid impermeable material.

In another of its aspects, the present invention provides a process for producing a foam element in a mold comprising a first mold half and a second mold, the first mold half comprising at least one ridge element, the first mold half and the second mold half being engageable to define a mold cavity, the process comprising the steps of:
  (i) substantially completely covering the at least one ridge element with a substantially fluid impermeable material;
  (ii) dispensing a liquid foamable composition in at least one of the first mold half and the second mold half;
  (iii) closing the first mold half and the second mold half;
  (iv) expanding the liquid foamable composition to substantially completely fill the mold cavity to produce the foam element.

In yet another of its aspects, the present invention provides a mold for producing a foam element, the mold comprising a first mold half and a second mold, the first mold half and the second mold half being engageable to define a mold cavity, the first mold half comprising at least one ridge element and the second mold half comprising at least one post, the least one ridge element and the at least one post oriented to substantially abut one another upon engagement of the first mold half and the second half.

Thus, the present inventors have discovered a novel foam element, having many useful applications. In a particularly preferred embodiment, the present foam element may used to produce a climate-control vehicular seat—i.e., a seat through which variable temperature air may be passed to improve occupant comfort and convenience. By designing specially coated channels in the foam element, diffusive loss of the variable temperature air (e.g., warm, cool or ambient air) is obviated or mitigated. Further, the present foam element may be fabricated without adding significant extra capital expense in the cost of manufacture.

BRIEF DESCRIPTION OF THE DRAWINGS

Embodiments of the present invention will be described with reference to the accompanying drawings, in which.

DETAILED DESCRIPTION OF THE PREFERRED EMBODIMENTS

Accordingly, an aspect of the present invention relates to a foam element useful in a vehicular seat such as a passenger seat. As used throughout this specification, the term "seat" is intended to have its conventional meaning and includes one or both of a cushion (i.e., the portion of the seat on which the occupant sits) and a back or backrest (i.e., the portion of the seat which supports the back of the occupant). As is known in the automotive, airline and related industries, a "seat" includes both a cushion and a back (or a backrest). Thus, as used herein, the term "seat" includes a cushion, a back (or backrest) or a unit construction comprising a cushion and a back (or backrest).

Figure 1:
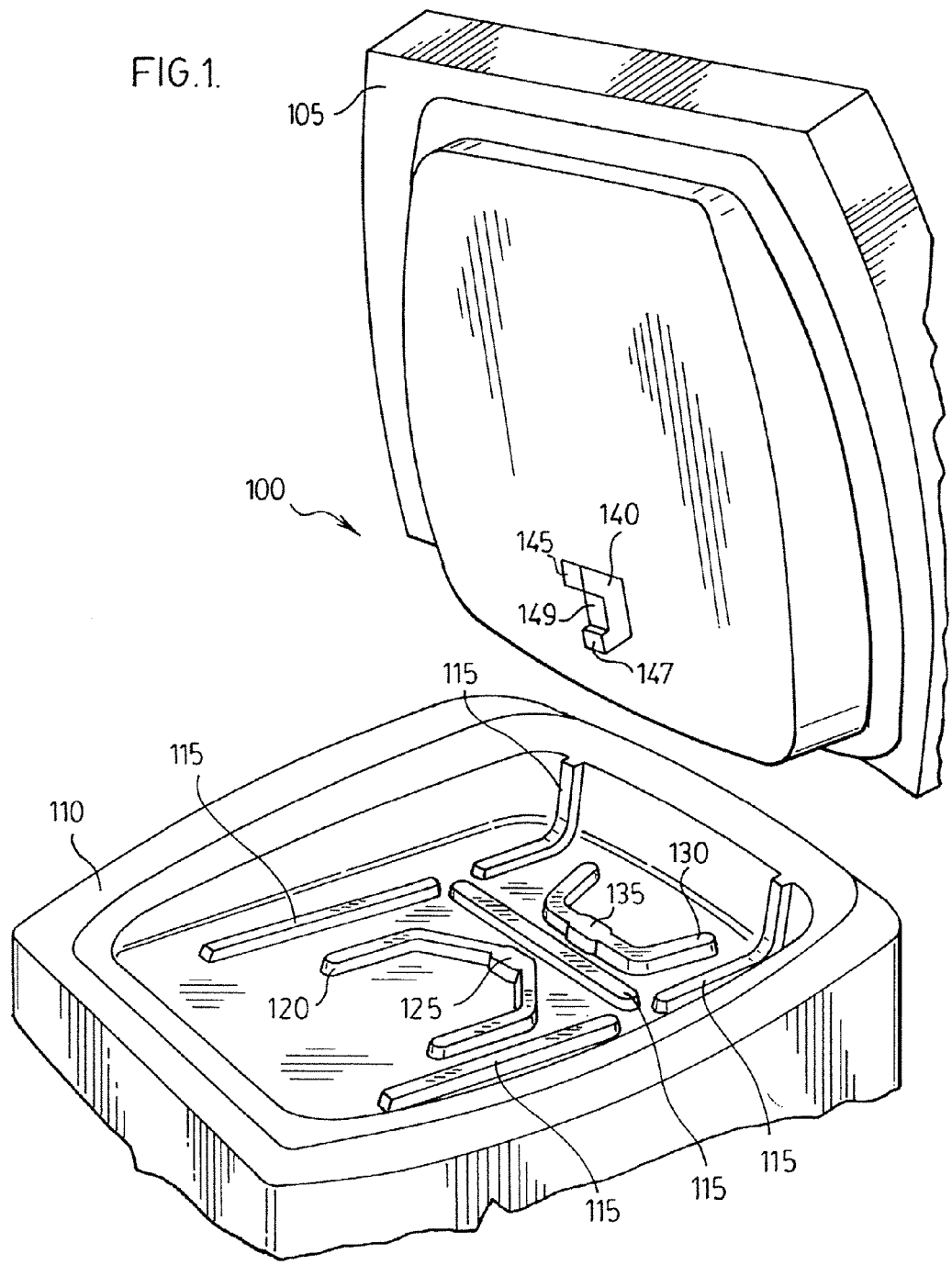
FIG. 1 illustrates a perspective view of a mold suitable for use in the present process.

With reference to FIG. 1, there is a illustrated a schematic perspective view of a mold 100 useful in the production of a foam element in accordance with the present process. Mold 100 comprises a lid 105 and a bowl 110 which are releasably engagable by an suitable means (not shown) to define a mold cavity.

Bowl 110 comprises a series of ridges 115 which are cast into a surface thereof. Ridges 115 serve to hold conventional touch fasteners which aid in securing a trim cover to the foam element to be produced. The disposition of such touch fasteners and use thereof in mold 100 is conventional and within the purview of a person skilled in the art. Also disposed in bowl 110 is a V-shaped ridge 120 having an apex portion 125. Also disposed in bowl 110 is a U-shaped ridge 130 having an apex portion 135. V-shaped portion 120 and U-shaped portion 130 may be cast into bowl 115 by an conventional means.

With reference to lid 105, there is disposed thereon a saddle 140 comprising a pair of projections 145, 147 which are interconnected by a central portion 149. As will be apparent to those of skill in the art, when lid 105 is swung to the closed position with respect to bowl 110, projection 45 abuts apex region 125 of V-shaped portion 120 and projection 147 abuts apex region 135 of U-shaped portion 130.

Figure 2:
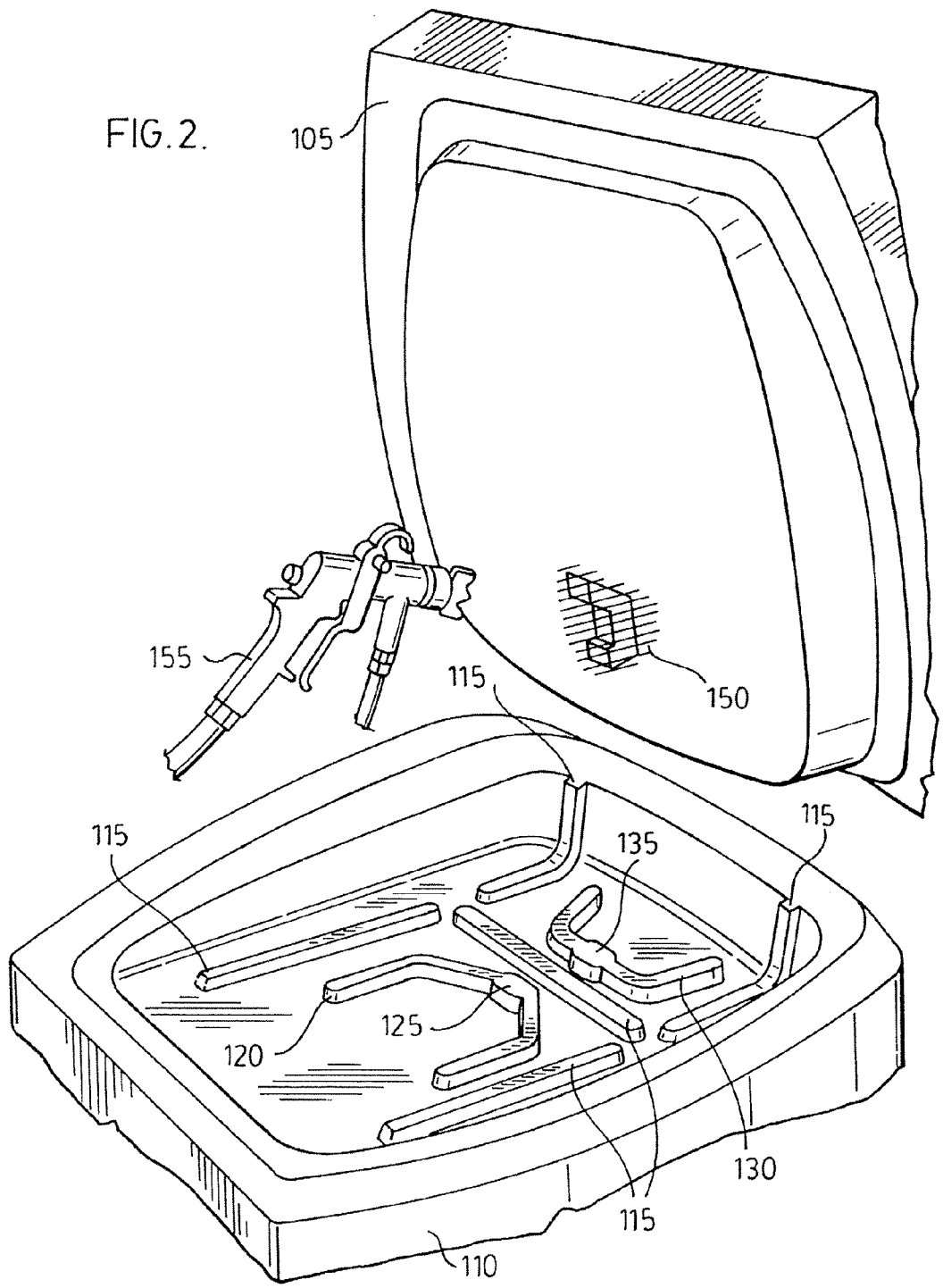
FIGS. 2 and 3 illustrate various steps of the present process.

With reference to FIG. 2, a step in the present process is illustrated. Specifically, a substantially fluid impermeable coating 150 is sprayed via a pressurized spray gun 155 to substantially cover saddle 140. A similar step (not shown) is conducted to substantially completely cover V-shaped portion 120 and U-shaped portion 130 with the substantially fluid impermeable coating.

The composition used to produce coating 150 is not particularly restricted. As stated above, coating 150 is a substantially fluid impermeable coating—i.e., a coating which is substantially impermeable to gases and/or liquids. A particularly preferred coating composition is an acrylonitrile-based emulsion coating composition. Such a composition is commercially available from Akzo Nobel Coatings Inc. as a black barrier emulsion composition which is available a liquid. The liquid emulsion may be sprayed and the solvent therein will evaporate relatively quickly leaving the substantially fluid impermeable coating. Thus, this preferred coating may be regarded as a one part system.

Of course, other coatings are possible including the so-called "two-part" systems where two streams are mixed at the head of the spray gun and react with one another substantially instantaneously to produce the coating.

Other coating approaches which will work in the present process include in-mold paints or coatings based on polyurethane, and/or polyurea.

Further, instead of spraying a coating onto saddle 140, it is possible to affix a film which covers saddle 140 (and separate pieces of film for covering V-shaped portion 120 and U-shaped portion 130). This film may be secured by any conventional means such as vacuum or mechanical means.

Many other approaches to achieving the substantially fluid impermeable coating will be apparent to those of skill in the art having the present specification in hand.

As this point in the process, saddle 140, V-shaped portion 120 and U-shaped portion 130 are substantially completely covered by the substantially fluid impermeable coating.

Figure 3:
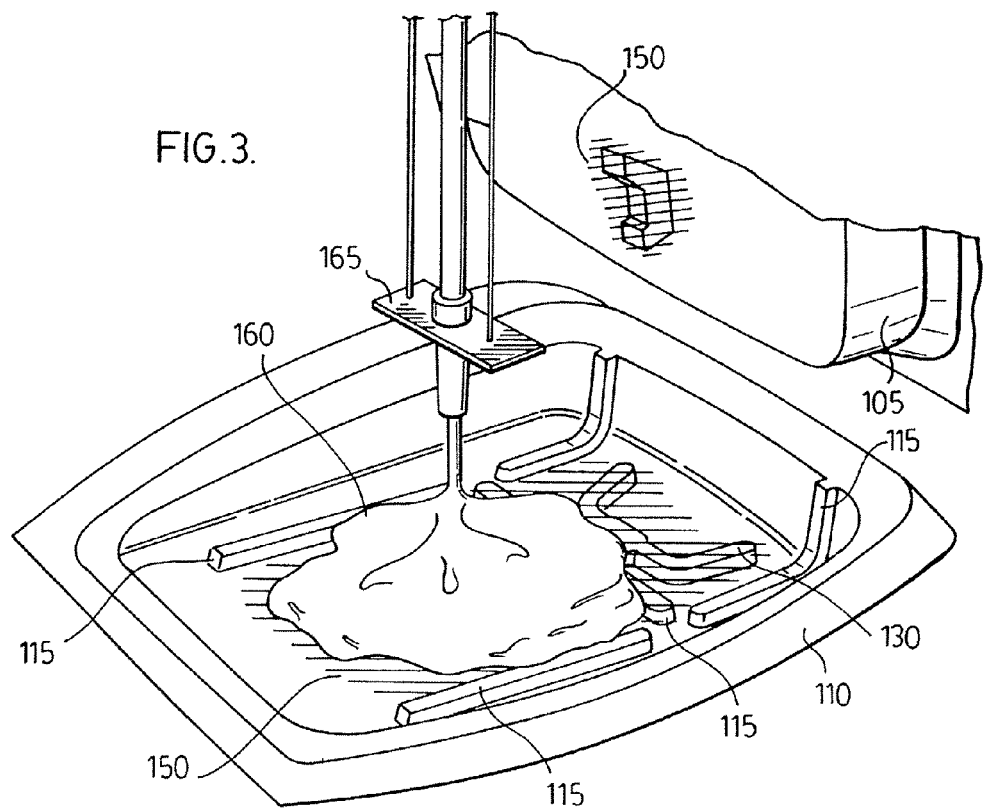

With reference to FIG. 3, a further step in the present process is illustrated. Thus, a liquid foamable composition 160 is dispensed in bowl 115 from a mixhead 165. In the embodiments specifically illustrated, mixhead 165 is a high pressure mixhead which serves to combine and impingement mix various streams in the reaction system to produce liquid foamable composition 160 which is then dispensed in bowl 110. This type of mixhead and the use thereof is conventional in the art and within the purview of a person skilled in the art. It is of course possible to use other mixheads such as low pressure mixheads and the like.

Once liquid foamable composition 160 has been dispensed in bowl 110, mixhead 165 is withdrawn and lid 105 is swung to the close position and engaged to bowl 110.

Once lid 105 and bowl 110 are closed, liquid foamable composition 160 expands to substantially completely fill the mold cavity. While not specifically shown in the Figures, it is of course conventional to design mold 100 to include various vent portions to allow expansion gases which are generated during expansion of liquid foamable composition 160 after the mold is closed to escape from the mold cavity. The design in use of such vent techniques is conventional and within the purview of a person skilled in the art.

After completion of expansion of liquid foamable composition 160, a foam part is produced which may be conventionally demolded by opening lid 105 and demolding a foam element 200. Specifically illustrated foam element 200 is a vehicle cushion having an upper or A-surface 205. Disposed in A-surface 205 are a series of trenches 210 corresponding to ridges 115 and bowl 110 of mold 100. These trenches contain one or more touch fasteners (not shown).

Also disposed on A-surface 205 is a V-shaped channel 220 having an apex region 225 and a U-shaped channel 230 having an apex region 235. As will be apparent to those of skill in the art, V-shaped 220 corresponds to V-shaped ridge 120 in bowl 110 of mold 100. Further, U-shaped channel 230 corresponds to U-shaped ridge 130 in bowl 110 of mold 100. V-shaped channel 220 and U-shaped channel 230 are interconnected by a saddle channel 240 having a first channel portion 245 connected to apex region 225 and a second channel portion 247 connected to apex region 235. First channel portion 245 and second channel portion 247 are interconnected by a central channel portion 249 which has a surface thereof exposed on the underside of foam element 200.

Figure 4:
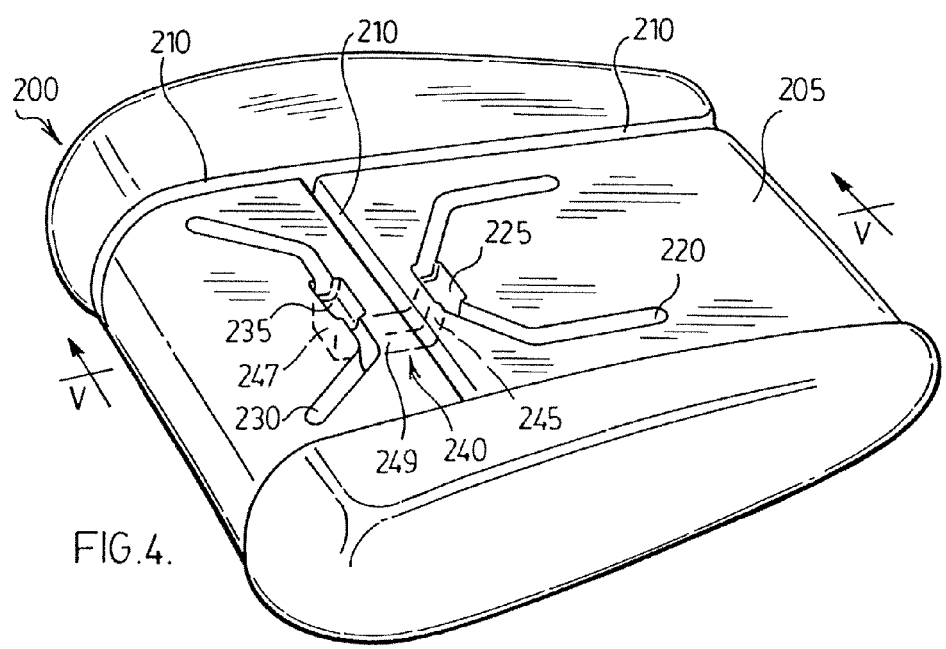
FIG. 4 illustrates a perspective view of a foam element produced in accordance with the present process.
Figure 5:
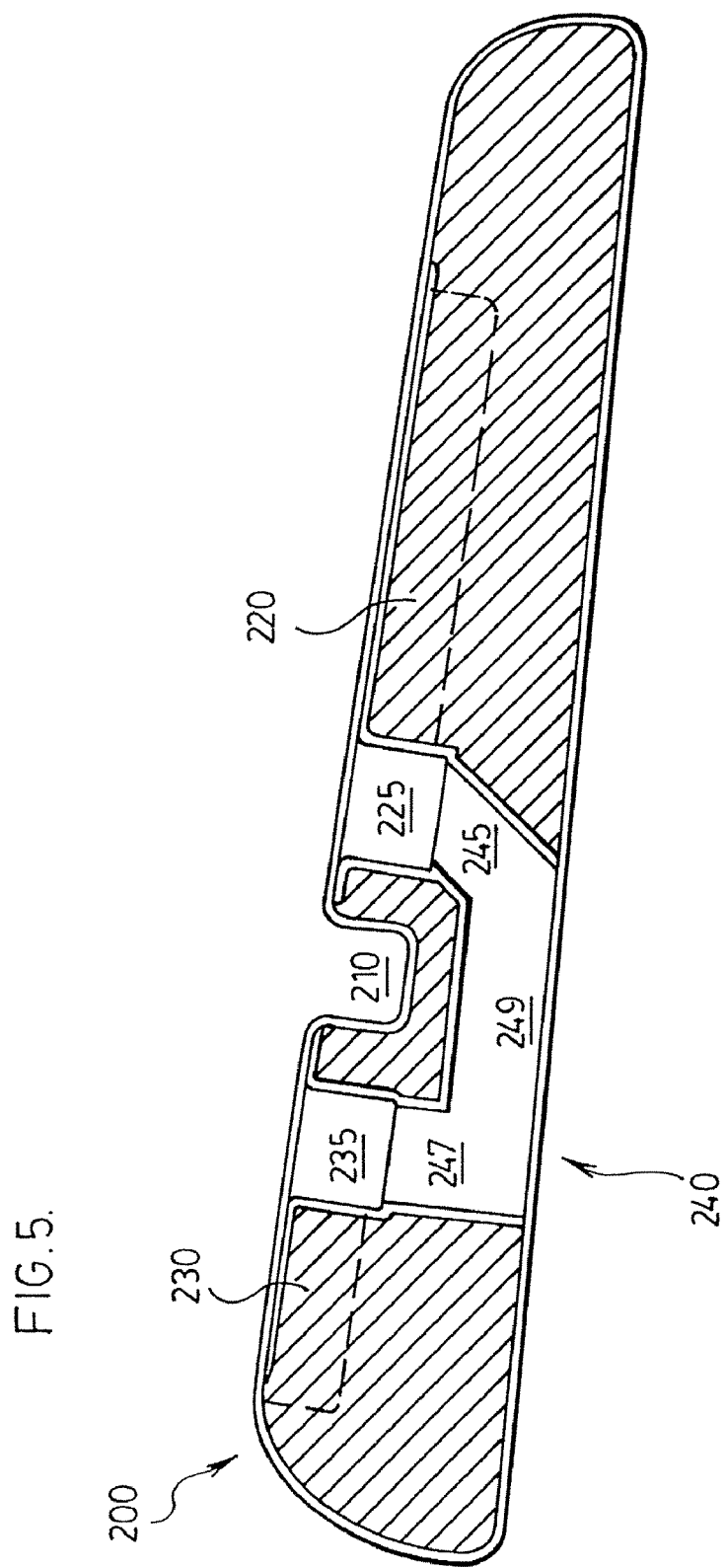
FIG. 5 illustrates a section taken along line V-V in FIG. 4.

As will be apparent to those of skill in the art from FIGS. 4 and 5, each of V-shaped channel 220, U-shaped channel 230 and saddle channel 240 (including horizontal and vertical surfaces therein) are coated with the substantially fluid impermeable coating applied to portions of mold 100 in FIG. 2. Thus, in essence, a network of channels is formed on the A-surface of foam element 200, which network is in communication with the underside of foam element 200. Each of these channels is coated with a material which prevents diffusion of gas into the foam element. The surface of central channel portion 249 which is exposed to the underside of foam element 200 may then be connected to a source of air (or other fluid). The temperature of the air will be controlled elsewhere and the air may simply be pumped through foam element 200 to provide increased comfort and convenience to the occupant of the seat.

Figure 6:
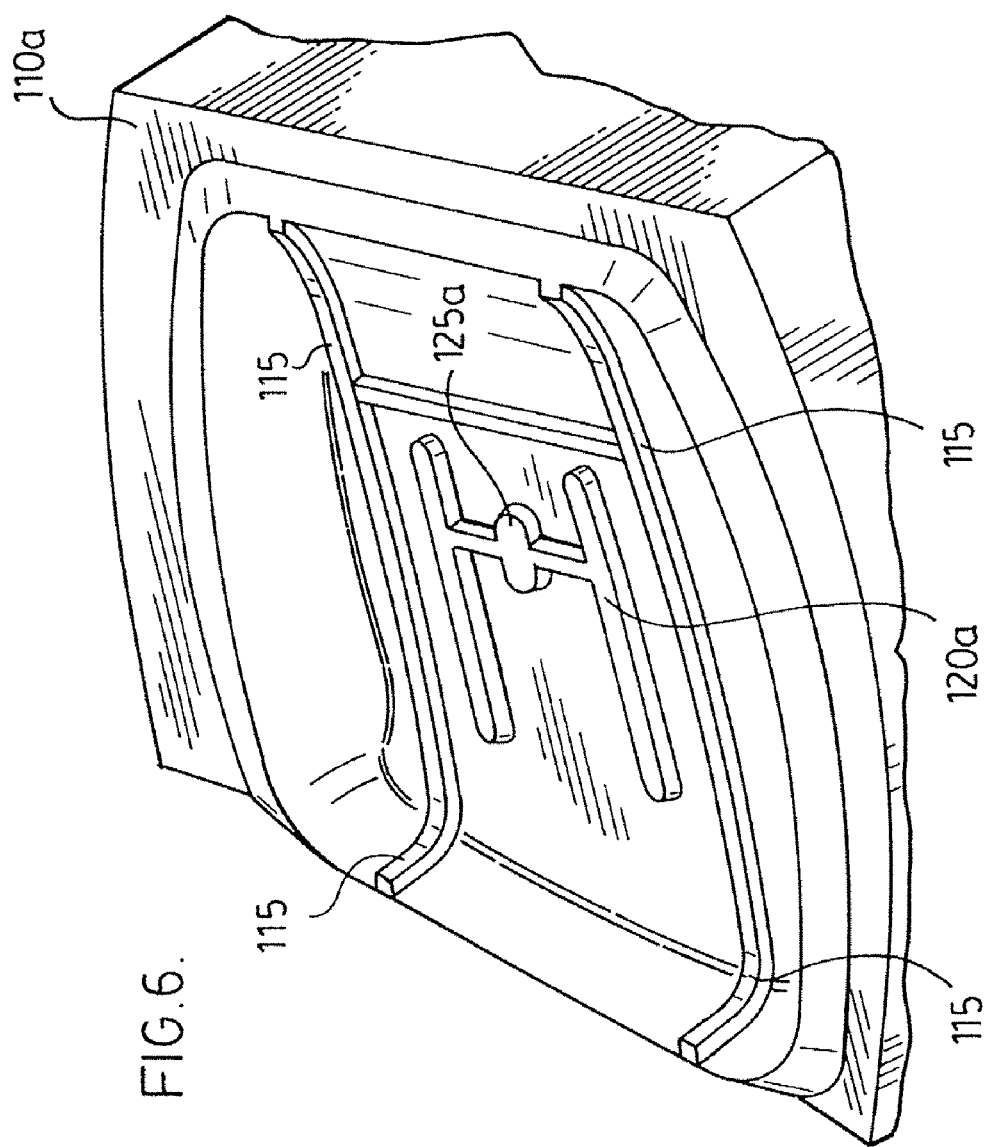
FIG. 6 illustrates an alternate embodiment of a mold useful in the present process.

With reference to FIG. 6, there is illustrated a perspective view of a bowl 110a which is preferred for use in producing a foam element to be used for a seat back. The principal difference in design of bowl 110a from that of bowl 110 (FIG. 1) is that bowl 110a comprises an H-shaped ridge 120a having a central region 125a. The lid (not shown) to be used with bowl 110a would be modified from lid 105 in Figure to include a post (not shown) have a terminal end which would about with central region 125a when the mold was closed.

While this invention has been described with reference to illustrative embodiments and examples, the description is not intended to be construed in a limiting sense. Thus, various modifications of the illustrative embodiments, as well as other embodiments of the invention, will be apparent to persons skilled in the art upon reference to this description. For example, while not specifically illustrated in the attached drawings, it is possible (and preferred) to pre-treat the interior surface of the of lid and bowl of the mold with a conventional mold release agent which facilitates post-production de-molding of the foam element. Further, it is possible to omit or modify the trim cover fastener system depicted in the attached drawings. Still further, it is possible to incorporate a frame element (e.g., made of metal or substantially rigid foam), vehicular attachment means and the like in the mold prior to dispensing the liquid foamable composition with the result that these elements, if present, are at least partially molded into the final product. Still further, while not specifically illustrated in the attached drawings, it is possible and, in some cases preferred, to secure a perforated liner (such as a ventilation scrim commercially available from Diversified Products) on the surface of the foam comprises the venting channels to diffuse gas (or other fluid) flow from the channels and away from the foam element. The perforated liner may be adhered to the foam element, molded into the foam element or otherwise secured to the foam element in a conventional manner. It is therefore contemplated that the appended claims will cover any such modifications or embodiments.

All publications, patents and patent applications referred to herein are incorporated by reference in their entirety to the same extent as if each individual publication, patent or patent application was specifically and individually indicated to be incorporated by reference in its entirety.

What is claimed is:

1. A foam seat element comprising:
    an isocyanate-based foam matrix having a seating surface with an occupant side and a non-occupant side, at least a portion of the occupant side of the seating surface comprising at least one open air channel having an air channel surface and being open at a top of said air channel, the air channel surface being coated with a substantially fluid impermeable material so as to leave the air channel substantially free of structure, the substantially fluid impermeable material covering horizontal and vertical surfaces within said at least one air channel, the substantially fluid impermeable material covering less than the complete occupant side of the seating surface.

2. The foam element defined in claim 1, wherein the substantially fluid impermeable material covers substantially all of the horizontal and vertical surfaces within said at least one air channel.

3. The foam element defined in claim 1, wherein the substantially fluid impermeable material comprises an elastomeric coating.

4. The foam element defined in claim 1, wherein the substantially fluid impermeable material comprises a thickness of less than or equal to about 1.5 mm.

5. The foam element defined in claim 1, wherein the substantially fluid impermeable material comprises a thickness in the range of from about 0.01 mm to about 1.5 mm.

6. The foam element defined in claim 1, wherein the substantially fluid impermeable material comprises a thickness in the range of from about 0.01 mm to about 1.0 mm.

7. The foam element defined in claim 1, further comprising a passageway in communication with the at least one channel and with another surface of the foam element.

8. The foam element defined in claim 7, wherein the surface comprises at least two channels.

9. The foam element defined in claim 8, wherein the two channels are interconnected by the passageway.

10. The foam element defined in claim 7, wherein the passageway comprises a passageway surface which is coated with a substantially fluid impermeable material.

11. The foam element defined in claim 1, wherein the substantially fluid impermeable material is substantially non-cellular.

12. The foam element defined in claim 1, wherein the substantially fluid impermeable material is produced in situ in a mold used to produce the foam matrix.

13. The foam element defined in claim 1, wherein the substantially fluid impermeable material is derived from an emulsion composition comprising polymer particles.

14. The foam element defined in claim 1, wherein the foam matrix comprises a polyurethane foam.

15. The foam element defined in claim 1, further comprising a diffuser element secured to the foam matrix and covering at least a portion of the at least one channel.

16. The foam element defined in claim 1, further comprising a trim cover over at least the surface of the foam element.

17. The foam element defined in claim 1, further comprising a frame element which is at least partially embedded in the foam matrix.

18. A vehicular seat comprising the foam element defined in claim 1.

19. A vehicular seat cushion comprising the foam element defined in claim 1.

20. A vehicular seat backrest comprising the foam element defined in claim 1.

21. The foam element defined in claim 1, wherein the substantially fluid impermeable material covers less than the complete seat surface.

22. The foam element defined in claim 1, wherein the substantially fluid impermeable material comprises an elastomeric acrylonitrile-based emulsion coating.

23. The foam element defined in claim 1, further comprising:
a trench channel disposed on the occupant side of the seating surface; and
a saddle channel disposed in said foam matrix beneath said trench channel and substantially adjacent the non-occupant side of the seating surface, said saddle channel having an interior surface coated with the substantially fluid impermeable material.

24. The foam element defined in claim 23, wherein a portion of the saddle channel interior surface is not coated with the substantially fluid impermeable material.

25. The foam element defined in claim 23, wherein the substantially fluid impermeable material coating the interior portion of the saddle channel comprises a film.

26. The foam element defined in claim 25, wherein the substantially fluid impermeable material coating the at least one open air channel comprises a non-rigid acrylonitrile-based emulsion coating.

27. The foam element defined in claim 1, wherein the at least one open air channel comprises a V-shaped channel and a U-shaped channel.

28. The foam element defined in claim 27, further comprising:
an apex portion disposed in each of said V-shaped channel and said U-shaped channel;
a trench channel disposed on occupant side of the seating surface between said V-shaped channel and said U-shaped channel; and
a saddle channel disposed in said foam matrix beneath said trench channel and substantially adjacent the non-occupant side of the seating surface, said saddle channel having an interior surface coated with the substantially fluid impermeable material, wherein the saddle channel is in fluid communication with the apexes of said V-shaped channel and said U-shaped channel.

29. A foam vehicle seat portion comprising:
an isocyanate-based foam matrix having a seating surface with an occupant side and a non-occupant side; and
at least one gas channel disposed in said matrix on the occupant side of the seating surface and having an open top and a gas channel surface with horizontal and vertical surfaces, at least a portion of the gas channel surface being coated with a substantially gas impermeable material to retard diffusion of gas through said gas channel surface into said foam matrix, the substantially gas impermeable material covering horizontal and vertical surfaces within said gas channel, which is otherwise substantially free of obstruction, the substantially fluid impermeable material covering less than the complete occupant side of the seating surface.

30. A foam vehicle seat portion according to claim 29, wherein the substantially fluid impermeable material covers substantially all of the horizontal and vertical surfaces within said at least gas channel.

31. The foam seat portion defined in claim 29, wherein the substantially gas impermeable material comprises an elastomeric coating.

32. The foam seat portion defined in claim 29, wherein the substantially gas impermeable material comprises a thickness of less than or equal to about 1.5 mm.

33. The foam seat portion defined in claim 29, wherein the substantially gas impermeable material comprises a thickness in the range of from about 0.01 mm to about 1.5 mm.

34. The foam seat portion defined in claim 29, wherein the substantially gas impermeable material comprises a thickness in the range of from about 0.01 mm to about 1.0 mm.

35. The foam seat portion defined in claim 29, further comprising a passageway in communication with the at least one gas channel and with another surface of the foam seat portion.

36. The foam seat portion defined in claim 35, wherein the surface comprises at least two channels.

37. The foam seat portion defined in claim 36, wherein the two channels are interconnected by the passageway.

38. The foam seat portion defined in claim 35, wherein the passageway comprises a passageway surface which is coated with the substantially gas impermeable material.

39. The foam seat portion defined in claim 29, wherein the substantially gas impermeable material is substantially non-cellular.

40. The foam seat portion defined in claim 29, wherein the substantially gas impermeable material is produced in situ in a mold used to produce the foam matrix.

41. The foam seat portion defined in claim 29, wherein the substantially gas impermeable material is derived from an emulsion composition comprising polymer particles.

42. The foam seat portion defined in claim 29, wherein the foam matrix comprises a polyurethane foam.

43. The foam seat portion defined in claim 29, further comprising a diffuser element secured to the foam matrix and covering at least a portion of the at least one channel.

44. The foam seat portion defined in claim 29, further comprising a trim cover over at least the surface of the foam seat portion.

45. The foam seat portion defined in claim 29, further comprising a frame element which is at least partially embedded in the foam matrix.

46. A vehicular seat comprising the foam seat portion defined in claim 29.

47. A vehicular seat cushion comprising the foam seat portion defined in claim 29.

48. A vehicular seat backrest comprising the foam seat portion defined in claim 29.

49. The foam seat portion defined in claim 29, wherein the substantially gas impermeable material covers less than the complete seat surface.

50. A foam vehicle seat element comprising:
an isocyanate-based foam matrix having a seating surface with an occupant side and a non-occupant side, at least a portion of said matrix surface being air-permeable;
an air channel disposed in said matrix surface on the occupant side of the seating surface, said air channel being open at the top and being substantially free of obstructions;
an air channel surface disposed on at least a portion of the air channel, said air channel surface comprising a substantially air-impermeable material which substantially prevents diffusion of air through said gas channel surface into said foam matrix, wherein: (i) the substantially air-impermeable material covers horizontal and vertical surfaces within said air channel, and (ii) the substantially fluid impermeable material covers less than the complete occupant side of the seating surface; and
an air permeable covering disposed over said air channel to permit air to flow from said air channel through said covering.

51. A foam vehicle seat element according to claim 50, wherein the foam matrix comprises a homogeneous isocyanate-based foam matrix.

52. The foam vehicle seat element defined in claim 50, wherein the substantially air-impermeable material comprises an elastomeric coating.

53. The foam vehicle seat element defined in claim 50, wherein the substantially air-impermeable material comprises a thickness of less than or equal to about 1.5 mm.

54. The foam vehicle seat element defined in claim 50, wherein the substantially air-impermeable material comprises a thickness in the range of from about 0.01 mm to about 1.5 mm.

55. The foam vehicle seat element defined in claim 50, wherein the substantially air-impermeable material comprises a thickness in the range of from about 0.01 mm to about 1.0 mm.

56. The foam vehicle seat element defined in claim 50, further comprising a passageway in communication with the air channel and with another surface of the foam vehicle seat element.

57. The foam vehicle seat element defined in claim 56, wherein the surface comprises at least two channels.

58. The foam vehicle seat element defined in claim 57, wherein the two channels are interconnected by the passageway.

59. The foam vehicle seat element defined in claim 56, wherein the passageway comprises a passageway surface which is coated with the substantially air-impermeable material.

60. The foam vehicle seat element defined in claim 50, wherein the substantially air-impermeable material is substantially non-cellular.

61. The foam vehicle seat element defined in claim 50, wherein the substantially air-impermeable material is produced in situ in a mold used to produce the foam matrix.

62. The foam vehicle seat element defined in claim 50, wherein the substantially air-impermeable material is derived from an emulsion composition comprising polymer particles.

63. The foam vehicle seat element defined in claim 50, wherein the foam matrix comprises a polyurethane foam.

64. The foam vehicle seat element defined in claim 50, further comprising a diffuser element secured to the foam matrix and covering at least a portion of the at least one channel.

65. The foam vehicle seat element defined in claim 50, further comprising a trim cover over at least the surface of the foam vehicle seat element.

66. The foam vehicle seat element defined in claim 50, further comprising a frame element which is at least partially embedded in the foam matrix.

67. A vehicular seat comprising the foam vehicle seat element defined in claim 50.

68. A vehicular seat cushion comprising the foam vehicle seat element defined in claim 50.

69. A vehicular seat backrest comprising the foam vehicle seat element defined in claim 50.

70. The foam vehicle seat element defined in claim 50, wherein the substantially air-impermeable material covers less than the complete seat surface.

* * * * *